(12) United States Patent
Walker

(10) Patent No.: US 9,669,749 B2
(45) Date of Patent: Jun. 6, 2017

(54) LIFT GATE LOADING RAMP

(71) Applicant: ANTHONY LIFTGATES, INC., Pontiac, IL (US)

(72) Inventor: Thomas Walker, Pontiac, IL (US)

(73) Assignee: Anthony Liftgates, Inc., Pontiac, IL (US)

( * ) Notice: Subject to any disclaimer, the term of this patent is extended or adjusted under 35 U.S.C. 154(b) by 0 days.

(21) Appl. No.: 14/840,885

(22) Filed: Aug. 31, 2015

(65) Prior Publication Data

US 2016/0075270 A1    Mar. 17, 2016

Related U.S. Application Data

(60) Provisional application No. 62/050,506, filed on Sep. 15, 2014.

(51) Int. Cl.
*B60P 1/44* (2006.01)
*B60P 1/43* (2006.01)

(52) U.S. Cl.
CPC ............... *B60P 1/4492* (2013.01); *B60P 1/43* (2013.01); *B60P 1/4421* (2013.01); *B60P 1/4457* (2013.01); *B60P 1/4471* (2013.01)

(58) Field of Classification Search
CPC ......... B60P 1/4492; B60P 1/43; B60P 1/4421; B60P 1/4457; B60P 1/4471
USPC ................ 187/242, 313; 414/540, 545, 542; 410/84
See application file for complete search history.

(56) References Cited

U.S. PATENT DOCUMENTS

| 2,530,341 | A | | 11/1950 | Satsky | |
|---|---|---|---|---|---|
| 3,172,501 | A | | 3/1965 | Ramer | |
| 3,521,775 | A | | 7/1970 | Vermette | |
| 3,991,857 | A | | 11/1976 | Wolk et al. | |
| 4,063,619 | A | | 12/1977 | Drews | |
| 4,219,103 | A | | 8/1980 | Harsacky | |
| 4,479,753 | A | | 10/1984 | Thorley | |
| 4,556,128 | A | * | 12/1985 | Thorley | B60P 1/4421 105/447 |
| 5,052,521 | A | | 10/1991 | Wendt et al. | |
| 5,122,026 | A | * | 6/1992 | Kent | B60P 1/4421 187/242 |
| 5,284,414 | A | * | 2/1994 | Kempf | A61G 3/06 14/71.1 |
| 5,382,130 | A | * | 1/1995 | Kempf | A61G 3/06 14/71.3 |
| 5,449,267 | A | * | 9/1995 | Ablabutyan | B60P 1/4457 187/242 |
| 5,683,221 | A | * | 11/1997 | Ablabutyan | B60P 1/4457 410/94 |
| 6,039,528 | A | * | 3/2000 | Cohn | B60P 1/4457 414/546 |
| 6,062,805 | A | * | 5/2000 | Tremblay | A61G 3/06 414/540 |
| 6,398,479 | B1 | * | 6/2002 | Dupuy | B60P 1/445 414/540 |
| 7,491,026 | B2 | * | 2/2009 | Hooker | B60P 1/4421 187/243 |

(Continued)

*Primary Examiner* — Kaitlin Joerger
(74) *Attorney, Agent, or Firm* — Barnes & Thornburg LLP; Mark J. Nahnsen

(57) ABSTRACT

A lift gate for loading and unloading cargo from a vehicle. The lift gate includes a moveable load platform and a ramp. The ramp is coupled to the load platform such that the ramp rotates between various positions at the selection of a user.

17 Claims, 8 Drawing Sheets

(56) References Cited

U.S. PATENT DOCUMENTS

| | | | | |
|---|---|---|---|---|
| 7,637,518 | B2* | 12/2009 | Adair | B65G 69/30 |
| | | | | 280/163 |
| 9,341,212 | B2* | 5/2016 | Hambardzumyan | F16C 11/10 |
| 2006/0245886 | A1* | 11/2006 | Krause | B60P 1/4492 |
| | | | | 414/558 |
| 2012/0121369 | A1* | 5/2012 | Ablabutyan | B60P 1/4421 |
| | | | | 414/540 |
| 2013/0136567 | A1* | 5/2013 | Hambardzumyan | F16C 11/10 |
| | | | | 414/540 |
| 2014/0079517 | A1* | 3/2014 | Ablabutyan | B60P 1/445 |
| | | | | 414/546 |
| 2014/0154035 | A1* | 6/2014 | Walker | B60P 1/435 |
| | | | | 414/537 |

* cited by examiner

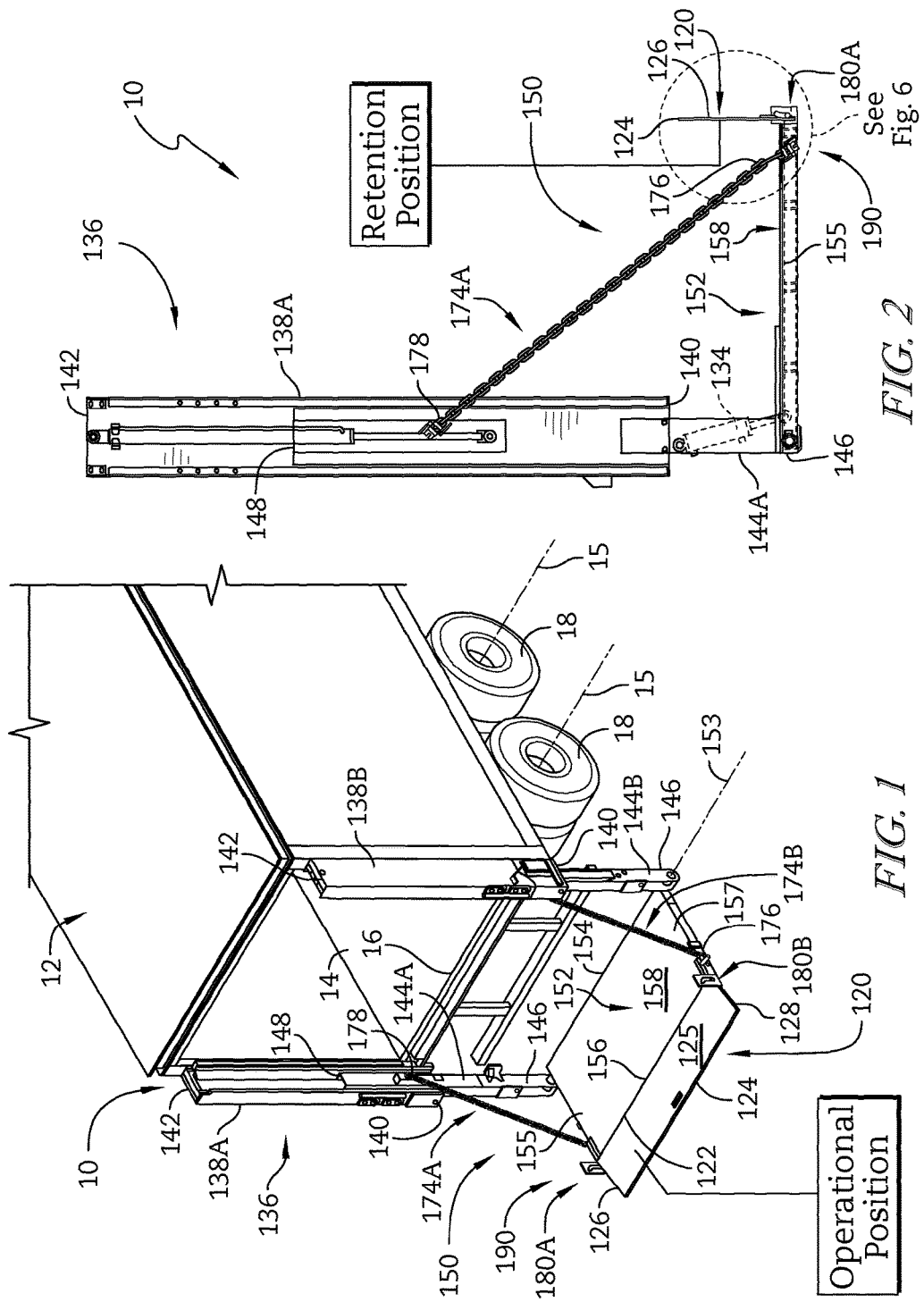

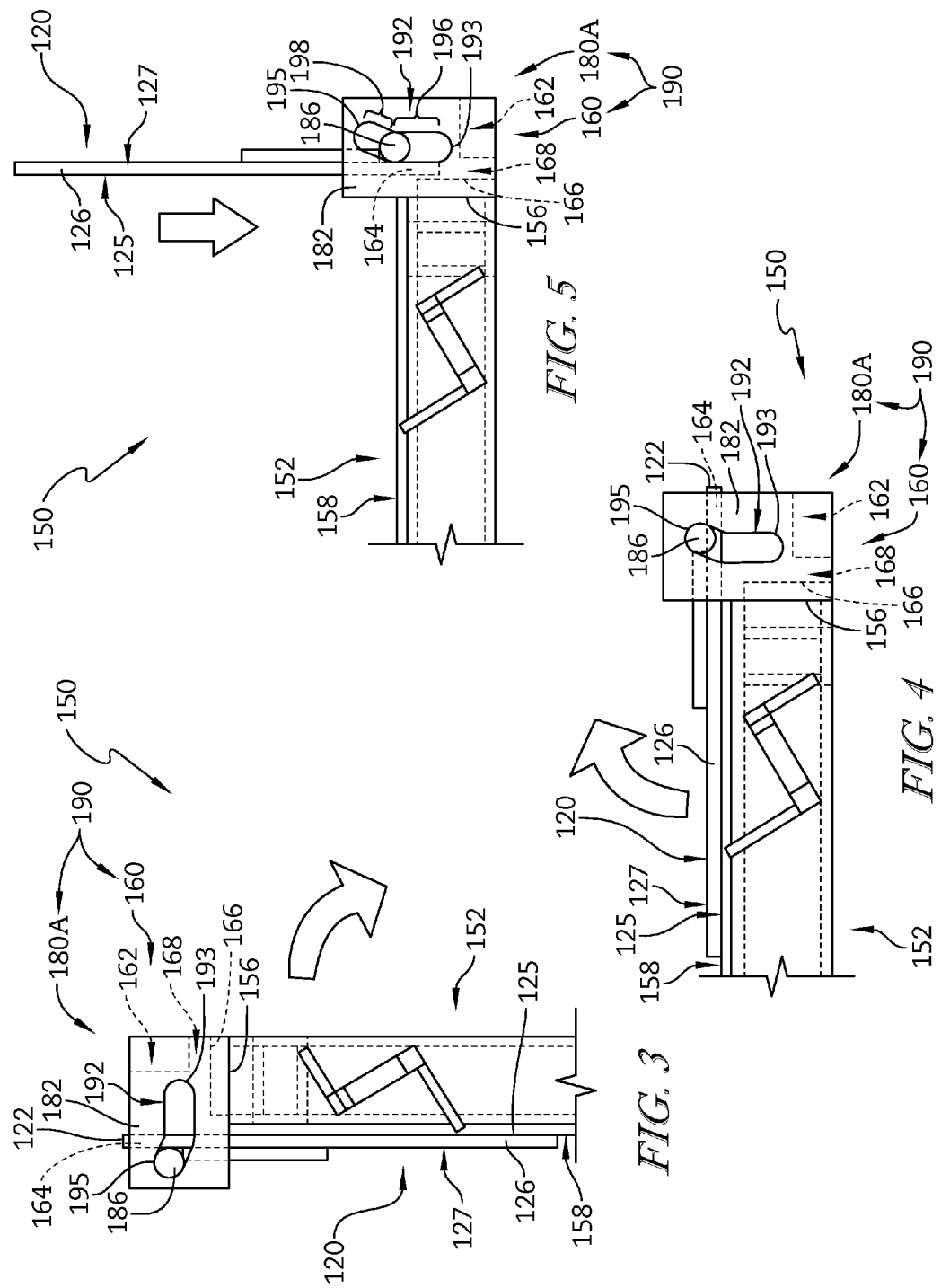

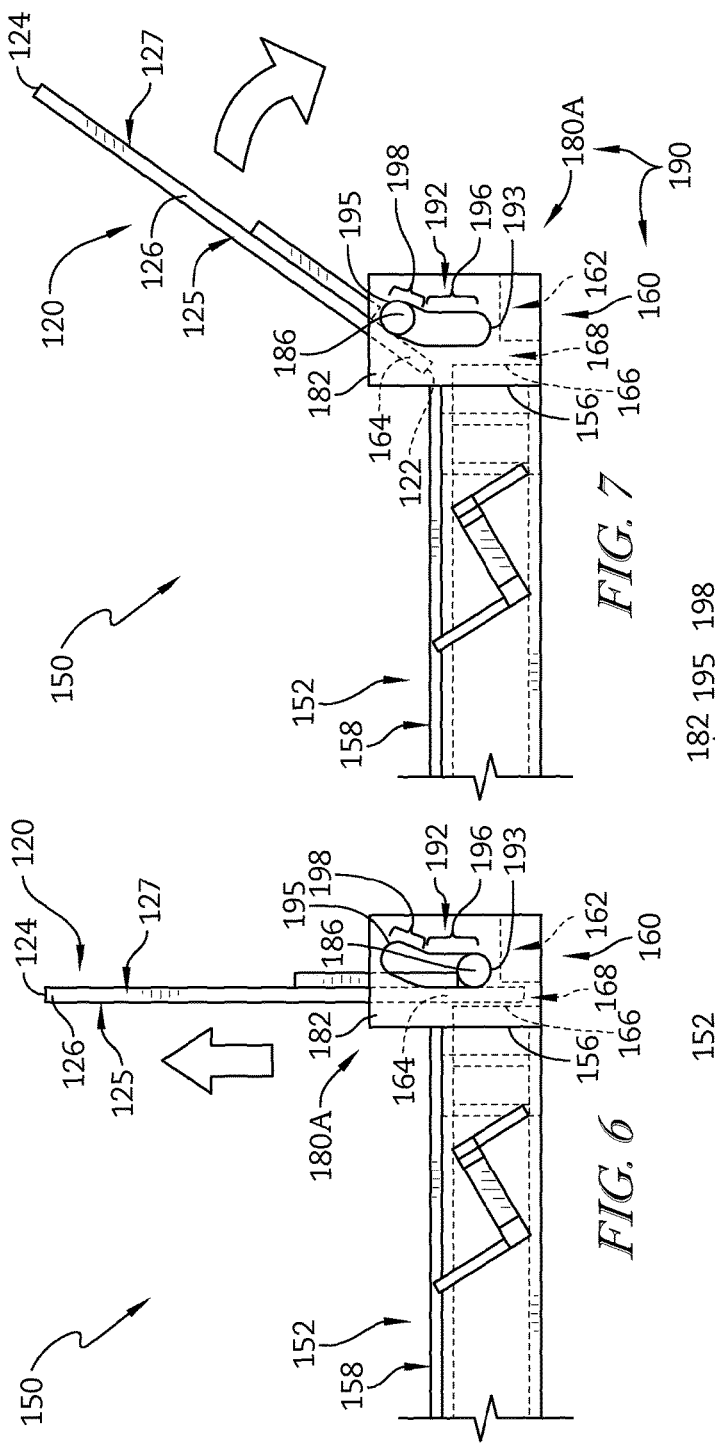

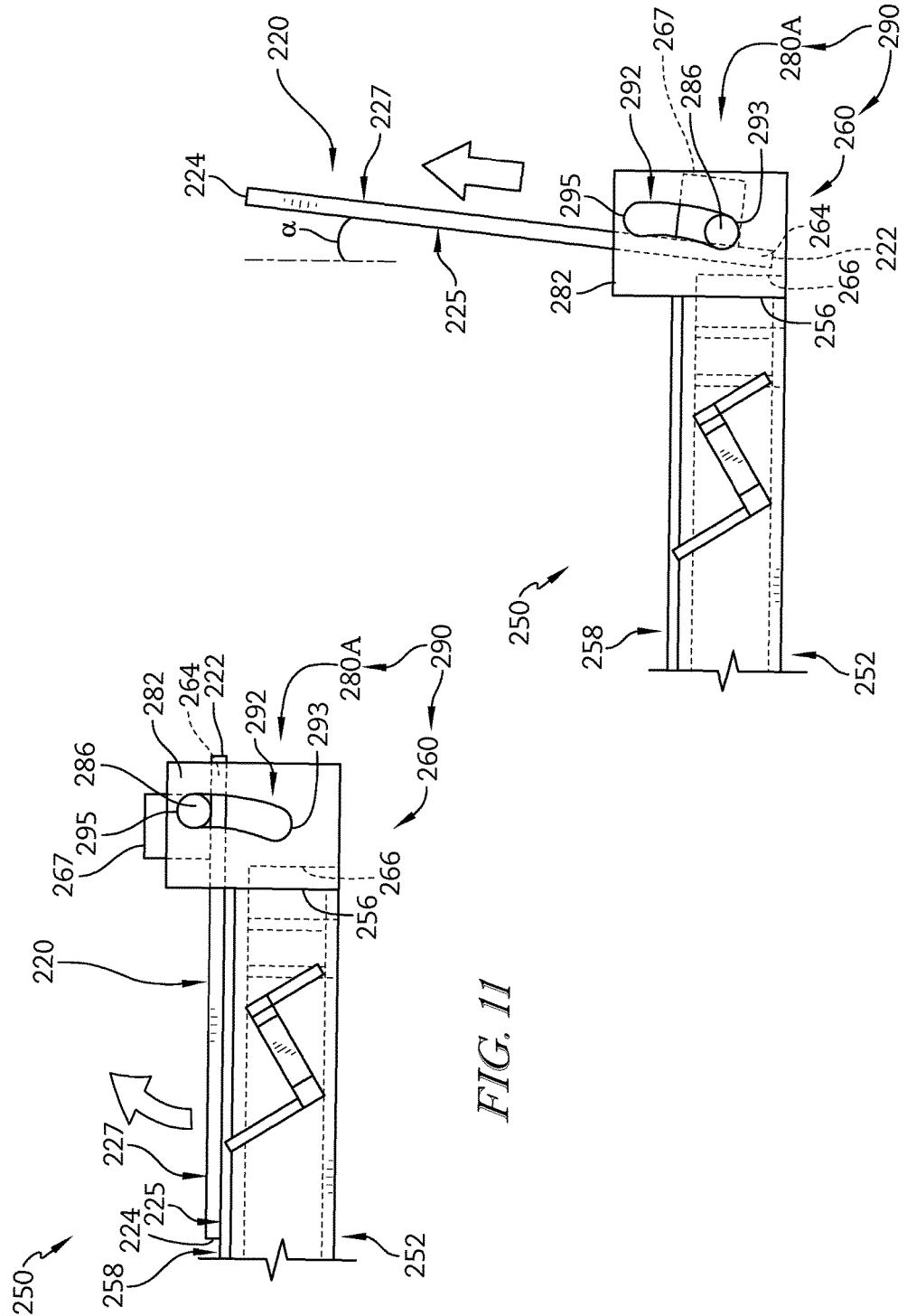

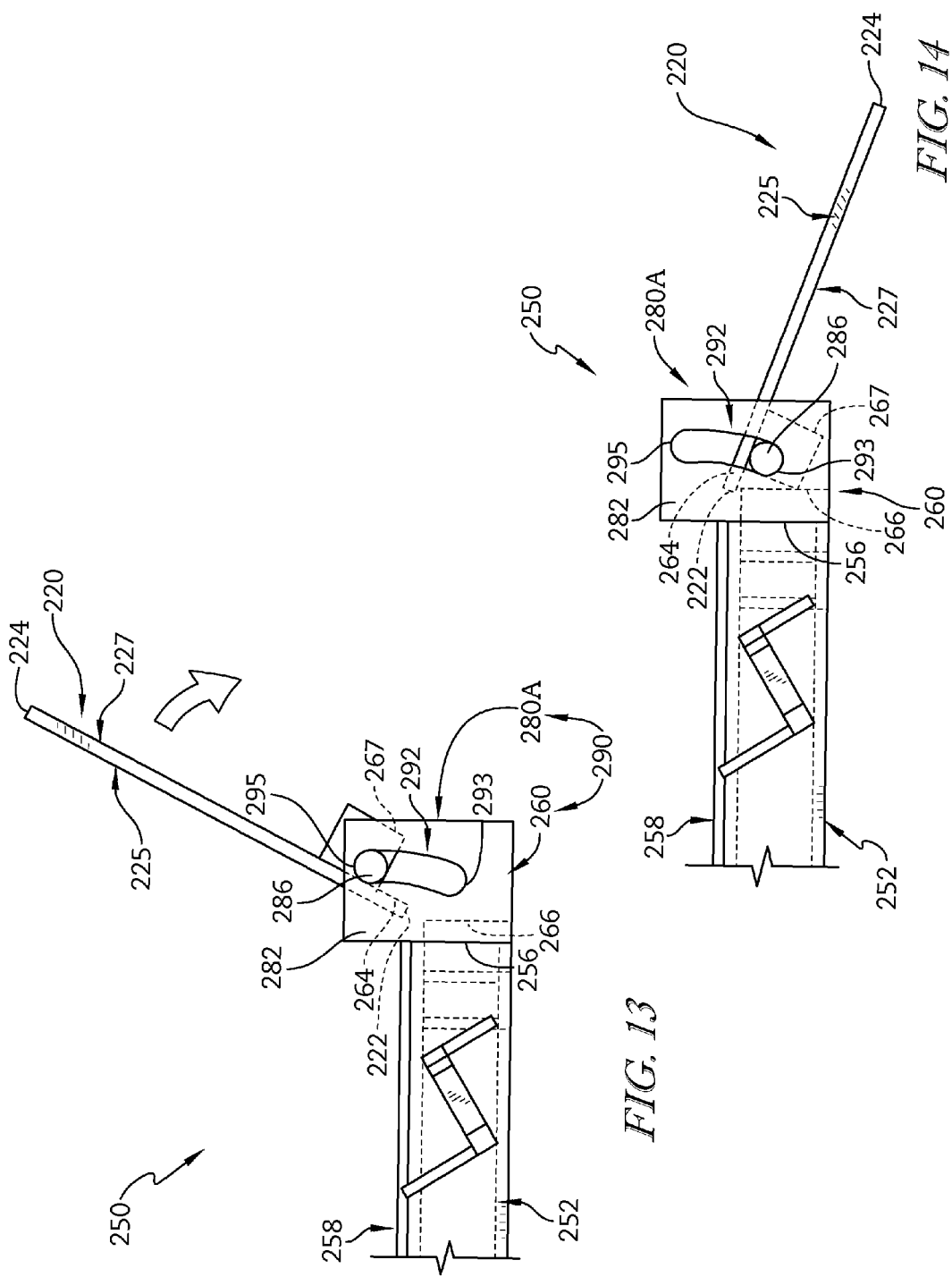

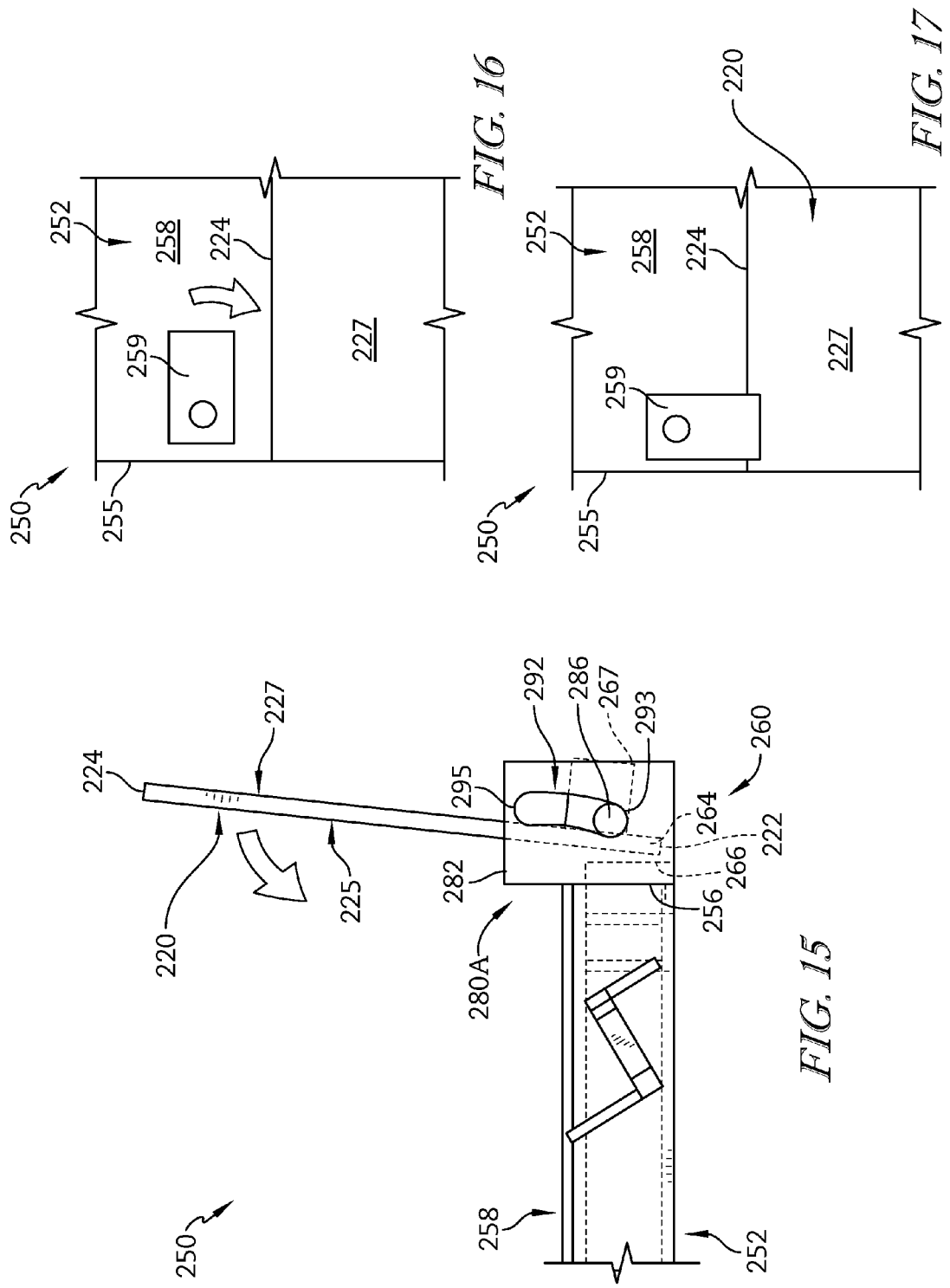

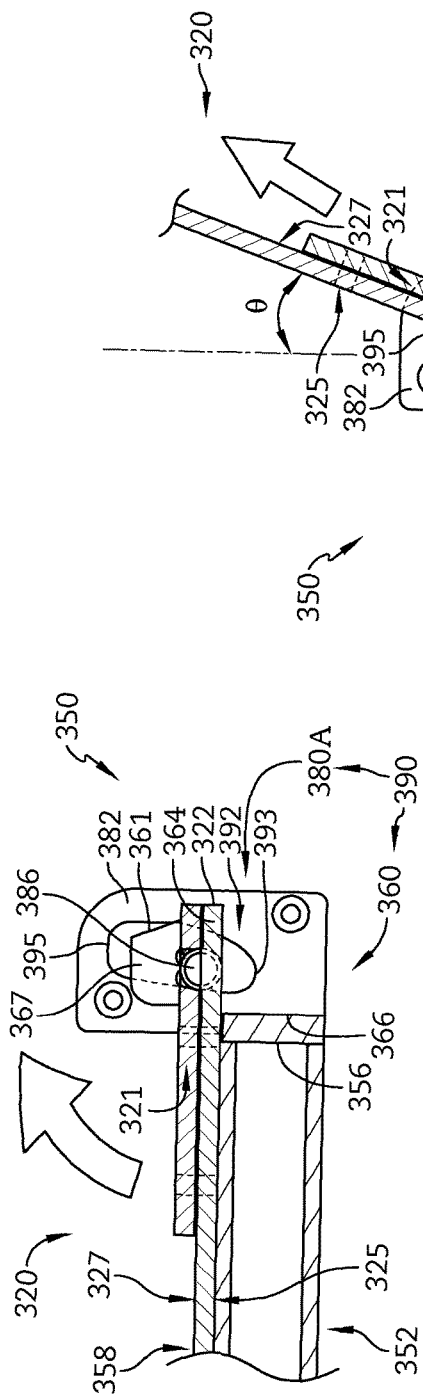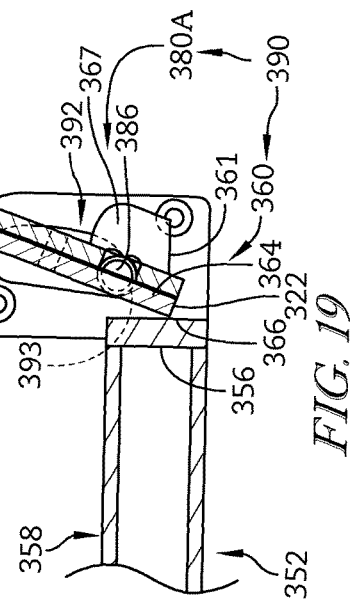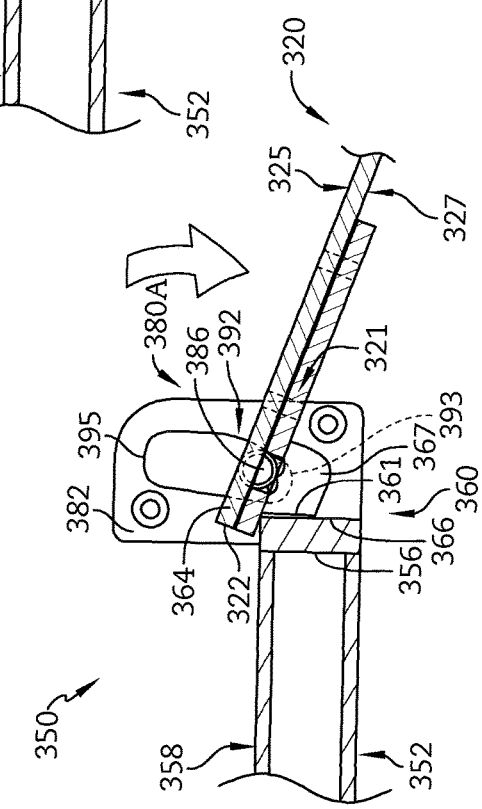

LIFT GATE LOADING RAMP

PRIORITY CLAIM

This application claims priority under 35 U.S.C. §119(e) to U.S. Provisional Application Ser. No. 62/050,506, filed Sep. 15, 2014, which is expressly incorporated by reference herein.

BACKGROUND

The present disclosure is directed to a lift gate having a load platform that is selectively moveable between a lowered position and a raised position, and a ramp pivotally coupled to the load platform such that cargo can be loaded onto or unloaded from the side of the load platform via the ramp.

Lift gates are used in connection with vehicles such as trucks and trailers to facilitate the loading and unloading of cargo from the vehicle when the cargo needs to be moved vertically between a loading surface, such as a ground surface or a dock surface, and the surface of the vehicle cargo floor. The lift gate is typically mounted to the rear end of a truck or trailer to facilitate loading and unloading of the truck or trailer. Often times, a complex assembly of springs is required to position the components of the lift gate, such that a design with fewer parts is desirable.

SUMMARY

A lift gate in accordance with the present disclosure may include a lift mechanism arranged to be coupled to a vehicle and a load platform coupled to the lift mechanism. The load platform may be selectively moveable between a lowered position and a raised position. The load platform may include a deck section, an end ramp, and a ramp positioner coupled between the end ramp and deck section. The deck section may include a proximal end coupled to the lift mechanism, a distal end spaced apart from the proximal end, a first side edge extending between the proximal end and the distal end of the deck section, and a second side edge spaced apart from the first side edge and extending between the proximal end and the distal end of the deck section. The end ramp may be coupled to the distal end of the deck section and arranged to rotate relative to the deck section between a closed position, a retention position, and an operational position at the selection of a user. The ramp positioner may be arranged to retain the end ramp in the closed position, retention position, or operational position at the selection of a user.

In illustrative embodiments, the ramp positioner may include one or more ramp guides and a ramp lock. Each ramp guide may include a guide plate coupled to the distal end of the deck section, a guide slot formed in the guide plate, and a guide pin coupled to the end ramp and arranged to move within the guide slot. The ramp lock may include a lock wall coupled to the distal edge of the deck section, a lock bar coupled to the guide plate, and a lock tab formed by an inner edge of the end ramp. A gap may be formed between the lock wall and lock bar and arranged to receive the lock tab therein.

Additional features of the present disclosure will become apparent to those skilled in the art upon consideration of illustrative embodiments exemplifying the best mode of carrying out the disclosure as presently perceived.

BRIEF DESCRIPTION

The detailed description particularly refers to the accompanying figures in which:

FIG. 1 is a perspective view of one embodiment of a lift gate in accordance with the present disclosure showing that the lift gate includes a deck section adapted to support items moved by the lift gate, an end ramp coupled to the deck section to restrict or allow movement of items from the deck section, and a ramp positioner interconnecting the end ramp and the deck section to cause the end ramp to be retained in a closed position as suggested in FIG. 4, a retention position as suggested in FIGS. 2 and 6, and an operational position;

FIG. 2 is a left-side elevation view of the lift gate in an expanded-use position and the end ramp in the retention position suggesting that the end ramp blocks movement of items positioned on the deck section as a result of using the ramp positioner to lock the end ramp in a generally vertical position as suggested in FIGS. 6 and 9;

FIG. 3 is an enlarged partial view of the lift gate of FIG. 2 showing the lift gate in a retracted-travel position with the end ramp in the storage position suggesting that the ramp positioner allows a top surface of the end ramp to generally mate with a support surface of the deck section to limit movement of the end ramp during transit of the lift gate and to provide a compact profile for the lift gate when not in use;

FIG. 4 is a view similar to FIG. 3 showing the lift gate has moved from the retracted-travel position to the expanded-use position and suggesting that the ramp positioner maintained the position of the end ramp relative to the deck section such that the end ramp is in a closed position;

FIG. 5 is a view similar to FIG. 4 showing that a user has moved the end ramp from the closed position to an intermediate position and suggesting that the ramp positioner allowed for rotation of the end ramp relative to the deck section;

FIG. 6 is a view similar to FIG. 5 showing that the ramp positioner includes a ramp guide and a ramp lock and suggesting that the ramp lock restricts rotation of the end ramp relative to the deck section when the end ramp has been moved from the intermediate position to the retention position;

FIG. 7 is a view similar to FIG. 6 showing that the end ramp has been moved to a swing position and suggesting that the end ramp is disengaged from the ramp lock and may rotate relative to the deck section;

FIG. 8 is a view similar to FIG. 7 showing the end ramp has moved to the operational position and suggesting that the ramp positioner limits rotation of the end ramp relative to the deck section such that the end ramp is maintained in the operational position and allows a user to move items onto or off of the deck section;

Figure 10:
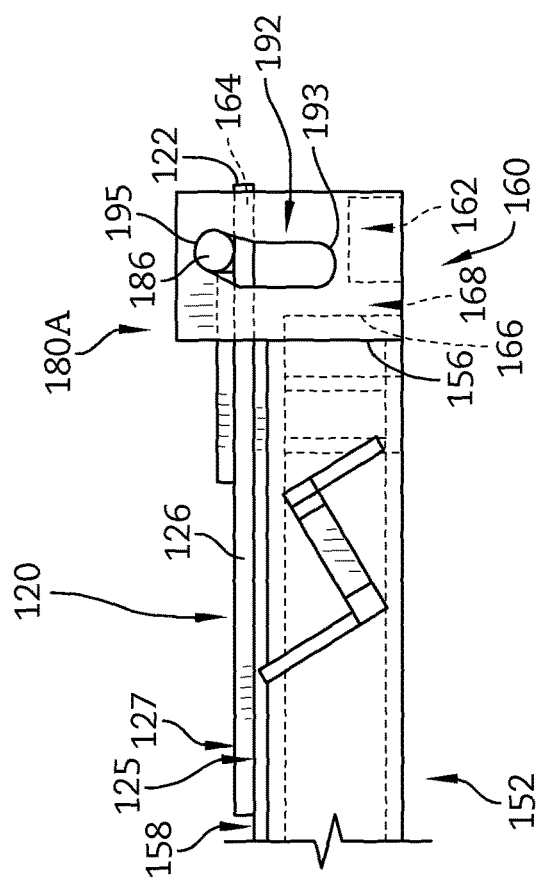
FIG. 10 is a view similar to FIG. 9 showing the end ramp in the closed position and suggesting that the end ramp was disengaged from the ramp lock and moved from the intermediate position.

FIG. 11 is an enlarged side elevation view of another embodiment of a lift gate in accordance with the present disclosure showing that the lift gate includes a deck section adapted to support items moved by the lift gate, an end ramp coupled to the deck section to restrict or allow movement of items from the deck section, and a ramp positioner interconnecting the end ramp and the deck section to cause the end ramp to be retained in a closed position, a retention position as suggested in FIGS. 12 and 15, and an operational position as suggested in FIG. 14;

FIG. 12 is a view similar to FIG. 11 showing the end ramp in the retention position and suggesting that the ramp positioner locks the end ramp in a generally upright position at an angle relative to vertical to prevent inadvertent rotation of the end ramp;

FIG. 13 is a view similar to FIG. 12 showing that the end ramp has been moved to a swing position and suggesting that the end ramp is disengaged from the ramp lock and may rotate relative to the deck section;

FIG. 14 is a view similar to FIG. 13 showing the end ramp has moved to the operational position and suggesting that the ramp positioner limits rotation of the end ramp relative to the deck section such that the end ramp is maintained in the operational position and allows a user to move items onto or off of the deck section;

FIG. 15 is a view similar to FIG. 12 showing the end ramp in the retention position and suggesting that the end ramp may rotate relative to the deck section from the retention position to the closed position without lifting the end ramp;

FIG. 16 is a partial top plan view of the lift gate of FIGS. 11-15 showing a ramp retainer positioned on the deck section and suggesting the ramp retainer may rotate relative to the deck section;

FIG. 17 is a view similar to FIG. 16 showing the ramp retainer has rotated to overlay and engage the end ramp and suggesting that the ramp retainer limits rotation of the end ramp relative to the deck section;

FIG. 18 is an enlarged sectional side elevation view of another embodiment of a lift gate in accordance with the present disclosure showing that the lift gate includes a deck section adapted to support items moved by the lift gate, an end ramp coupled to the deck section to restrict or allow movement of items from the deck section, and a ramp positioner interconnecting the end ramp and the deck section to cause the end ramp to be retained in a closed position, a retention position as suggested in FIG. 19, and an operational position as suggested in FIG. 20;

FIG. 19 is a view similar to FIG. 18 showing the end ramp in the retention position and suggesting that the ramp positioner locks the end ramp in a generally upright position at an angle relative to vertical to prevent inadvertent rotation of the end ramp; and FIG. 20 is a view similar to FIG. 19 showing the end ramp has moved to the operational position and suggesting that the ramp positioner limits rotation of the end ramp relative to the deck section such that the end ramp is maintained in the operational position and allows a user to move items onto or off of the deck section.

DETAILED DESCRIPTION

The present disclosure is directed to a lift gate for a vehicle having a load platform that is selectively moveable between a lowered position and a raised position and a ramp coupled to a the load platform for loading and unloading of cargo onto or from the load platform by way of the ramp. An embodiment of the lift gate is shown in FIGS. 1-10 as lift gate 10. Lift gate 10 is adapted to be mounted to the aft end of a vehicle 12. Vehicle 12 includes a truck, trailer, or other cargo conveying apparatus. Vehicle 12 includes a planar and horizontal cargo floor 14 having a linear rear edge 16. Vehicle 12 includes wheels 18 rotatably mounted to vehicle 12 for rotation about one or more rotational axes 15. Rear edge 16 of cargo floor 14 and rotational axes 15 of wheels 18 are parallel to one another. Vehicle 12 includes a transverse axis that is parallel to rear edge 16 of cargo floor 14 and rotational axes 15 of wheels 18, and a longitudinal axis that extends from the aft end to the front end of vehicle 12 perpendicular to rear edge 16 of cargo floor 14 and rotational axes 15 of wheels 18. The surface of cargo floor 14 of vehicle 12 is typically located at a vertical height above a loading surface. The loading surface may be part of the surface of the ground, road, parking lot or the like on which wheels 18 of vehicle 12 are supported, or part of the surface of a loading dock, side walk or the like which is located at a vertical height above the surface on which the wheels 18 are supported.

Lift gate 10 includes a lift mechanism 136. Lift mechanism 136 includes columns 138A and 138B that are adapted to be stationarily mounted to the aft end of vehicle 12 adjacent rear edge 16 of cargo floor 14. Each column 138A-B is linear and extends vertically between a bottom end 140 and a top end 142. Columns 138A-B are spaced apart from one another and are parallel to one another and are located at opposite ends of rear edge 16 of cargo floor 14. Lift mechanism 136 also includes lifting posts 144A and 144B. Lifting post 144A is operatively coupled to column 138A and lifting post 144B is operatively coupled to column 138B. Each lifting post 144A-B is linear and extends vertically between a bottom end 146 and a top end 148. Lifting post 144A is selectively vertically slideable with respect to column 138A between a raised position wherein bottom end 146 of lifting post 144A is adjacent bottom end 140 of column 138A and a lowered position wherein bottom end 146 of lifting post 144A is located adjacent the surface that supports wheels 18 and spaced apart from bottom end 140 of column 138A. Lifting post 144B is similarly selectively vertically moveable with respect to column 138B between a lowered position and a raised position. Lifting posts 144A-B are conjointly moveable between their raised position and lower position by a drive mechanism, such that lifting posts 144A-B move vertically upwardly and downwardly in unison with one another.

Lift mechanism 136 includes a selectively moveable and foldable load platform 150. Load platform 150 includes a deck section 152 and an end ramp 120. Deck section 152 is rectangular and includes a linear proximal edge 154 and a spaced apart and parallel and linear distal edge 156. Proximal edge 154 and distal edge 156 extend parallel to rear edge 16 of cargo floor 14 and rotational axes 15 of wheels 18. Deck section 152 also includes a linear first side edge 155 and a spaced apart and parallel and linear second side edge 157. First side edge 155 and second side edge 157 extend between and perpendicular to proximal edge 154 and distal edge 156. Deck section 152 includes a planar floor 158 mounted on a base. In some embodiments, floor 158 is a plate, such as checkered plate. Proximal edge 154 of deck section 152 is pivotally coupled to bottom ends 146 of lifting posts 144A-B for pivotal movement about a pivot axis 153. Deck section 152 extends between bottom ends 146 of lifting post 144A and 144B with bottom end 146 of lifting post 144A being located adjacent first side edge 155 of deck section 152 and bottom end 146 of lifting post 144B being located adjacent second side edge 157 of deck section 152. Pivot axis 153 is parallel to rear edge 16 of cargo floor 14 and rotational axes 15 of wheels 18 of vehicle 12.

Lift gate 10 includes an end ramp 120 that is pivotally coupled to distal edge 156 of deck section 152. End ramp 120 is rectangular and plate-like. End ramp 120 includes a linear inner edge 122 and spaced apart and parallel and linear outer edge 124. Inner edge 122 and outer edge 124 are parallel to proximal edge 154 and distal edge 156 of deck section 152. End ramp 120 also includes a linear first side edge 126 and spaced apart and parallel and linear second side edge 128. First and second side edges 126 and 128 extend perpendicularly between inner edge 122 and outer edge 124. End ramp 120 extends generally the width of deck section 152 between first side edge 155 and second side edge 157 of deck section 152. End ramp 120 includes a planar top surface 125. End ramp 120 is formed as a plate, such as checkered plate.

Lift gate 10 also includes support members 174A and 174B. Each support member 174A-B extends between a first end 176 and a second end 178. First end 176 of support member 174A is coupled to a distal end of first side edge 155 of deck section 152 and second end 178 of support member 174A is coupled to lifting post 144A. First end 176 of support member 174B is coupled to the distal end of second side edge 157 of deck section 152 and second end 178 of support member 174B is coupled to lifting post 144B. In some embodiments, support members 174A-B are a flexible, foldable or collapsible member such as a chain, cable, rope, scissors links or the like. Support members 174A-B are generally non-elastic under tension, but are collapsible or foldable under compression. If desired support members 174A and B is located within a flexible protective sleeve.

Load platform 150 is selectively moveable by lift mechanism 136 between a lowered position as shown in FIG. 1 wherein load platform 150 is located at a height below the height of cargo floor 14 of vehicle 12 and a raised position wherein the top surface of load platform 150 is located coplanar with the top surface of cargo floor 14 of vehicle 12 for movement of cargo between load platform 150 and cargo floor 14. Load platform 150 is also selectively moveable or foldable between an extended position as shown in FIGS. 1 and 2 and a retracted position suggested by FIG. 3. In the retracted position, load platform 150 is in a generally vertical position and located between columns 138A, 138B.

Lift gate 10 also includes actuators 134 connected between lifting posts 144A, 144B and deck section 152 as shown in FIG. 2. In the illustrative embodiment, actuator 134 is a hydraulic cylinder having a housing and an extendable and retractable ram. Actuator 134 is adapted to selectively pivot load platform 150 between the extended position of load platform 150 and the retracted or folded position of load platform 150.

End ramp 120 is pivotally connected to deck section 152 by a ramp positioner 190. In one illustrative embodiment, ramp positioner 190 includes a first ramp guide 180A and a second ramp guide 180B coupled to opposing ends of distal edge 156 of deck section 152, as shown in FIG. 1. Each ramp guide 180A, 180B includes a guide plate 182 coupled to distal edge 156 of deck section 152, a guide slot 192 formed in guide plate 182, and a guide pin 186 coupled to end ramp 120 and positioned to move within guide slot 192, as shown in FIG. 3.

Guide slot 192 extends between a first end 193 and a second end 195. In the illustrative embodiment, guide slot 192 includes a straight section 196 extending generally perpendicular relative to floor 158 of deck section 152 and an angled section 198 extending at an angle with respect to straight section 196. However, it should be noted that other guide slot profiles are contemplated. Guide pin 186 is sized and arranged to allow guide pin 186 to move within guide slot 192 between first end 193 and second end 195. In the illustrative embodiment, guide pin 186 is generally cylindrical allowing for rotation of guide pin 186 when positioned within guide slot 192. In some embodiments, guide pin 186 includes a pair of separate pins coupled to end ramp 120 at opposing sides thereof. In some embodiments, guide pin 186 is a single continuous rod extending along end ramp 120 to form the pins at opposing sides of end ramp 120.

Ramp positioner 190 further includes a ramp lock 160 as shown in FIGS. 3-10. Ramp lock 160 includes a lock bar 162 coupled to guide plate 182, a lock wall 166 coupled to distal edge 156 of deck section 152, and a lock tab 164 formed by inner edge 122 of end ramp 120. In one illustrative embodiment, lock tab 164 is generally parallel to end ramp 120 and extends therefrom. Guide pin 186 is connected to a bottom surface 127 of end ramp 120 and positioned near lock tab 164 of end ramp 120.

In the illustrative embodiment, lock bar 162 includes two or more separate bars coupled to guide plates 182 of each ramp guide 180A, 180B. In some embodiments, lock bar 162 is a single continuous bar extending between guide plates 182 of each ramp guide 180A, 180B. In some embodiments, lock wall 166 includes one or more wall sections positioned along distal edge 156 of deck section 152. In some embodiments, lock wall 166 is a single continuous wall extending between guide plates 182 of each ramp guide 180A, 180B. In one illustrative embodiment, lock wall 166 and lock bar 162 is positioned to form a gap 168 sized and arranged to allow lock tab 164 of end ramp 120 to be positioned therein.

In operation, ramp positioner 190 allows a user to move end ramp 120 between several discrete use positions. For example, as shown in FIG. 3, end ramp 120 is placed in a storage position for when vehicle 12 is in transit between various locations. Load platform 150 is arranged in a generally vertical position, and ramp positioner 190 allows end ramp 120 to hang in a generally vertical position. In one embodiment, planar top surface 125 of end ramp 120 is generally mated with floor 158 of deck section 152. Angled section 198 of guide slot 192 forces end ramp 120 against deck section 152 due to the weight of end ramp 120, thereby limiting movement of end ramp 120 during transit of vehicle 12 and reducing the risk of damage which is caused by end ramp 120 striking other components.

In one illustrative embodiment, a user may move end ramp 120 between the storage position described above and a retention position shown in FIG. 6. Beginning at FIG. 3, a user may lower load platform 150 from a generally vertical position to a generally horizontal position as shown in FIG. 4. A user may grip end ramp 120 along outer edge 124 thereof to lift and rotate end ramp 120 about guide pin 186. A user may arrange end ramp 120 in a generally vertical position, as shown in FIG. 5, and lower lock tab 164 into gap 168 between lock wall 166 and lock bar 162, as shown in FIG. 6.

Once in the retention position shown in FIG. 6, ramp lock 160 and ramp guides 180A, 180B cooperate to restrict rotation of end ramp 120. For example, a lateral force applied to top surface 125 of end ramp 120 is counteracted by lock tab 164 contacting lock wall 166 and guide pin 186 contacting guide slot 192. As such, a user may remove items from vehicle 12 and place them on load platform 150, and end ramp 120 blocks the items from falling off distal edge 156 of deck section 152. Conversely, a lateral force applied to bottom surface 127 of end ramp 120 is counteracted by lock tab 164 contacting lock bar 162 and guide pin 186 contacting guide slot 192.

In the illustrative embodiment, a user may move end ramp 120 between the retention position and an operational position shown in FIG. 8. Beginning at FIG. 6, a user may grip end ramp 120 along outer edge 124 thereof to lift end ramp 120 into a swing position as shown in FIG. 7. In the swing position, lock tab 164 is clear of lock wall 166, allowing lock tab 164 to pass over lock wall 166 and allowing a user to rotate end ramp 120. Second end 195 of guide slot 192 is positioned such that when guide pin 186 contacts second end 195 of guide slot 192, lock tab 164 does not contact lock wall 166. In the illustrative embodiment, angled section 198 of guide slot 192 allows guide pin 186 to be moved away from lock wall 166 to free lock tab 164 from contact with lock wall 166. Angled section 198 of guide slot 192 allows a user to rotate end ramp 120 while maintaining a low profile of guide plates 182. However, it should be noted that other slot arrangements are contemplated. For example, curved or generally straight guide slots is used.

A user may rotate end ramp 120 while in the swing position shown in FIG. 7 to the operational position shown in FIG. 8. Outer edge 124 of end ramp 120 is in contact with a loading surface to allow items located on load platform 150 to be moved to the loading surface. Alternatively, outer edge 124 of end ramp 120 is located above or lateral to the loading surface. In such a case, ramp guides 180A, 180B and ramp lock 160 cooperate to maintain end ramp 120 in the operational position. For example, bottom surface 127 of end ramp 120 contacts lock bar 162 while guide pin 186 contacts guide slot 192 to limit rotation of end ramp 120. Additionally, bottom surface 127 of end ramp 120 cooperates with the top of lock wall 166 to align inner edge 122 of end ramp 120 with distal edge 156 of deck section 152. A user may move end ramp 120 back to either the closed position or retention position by lifting end ramp 120 into the swing position and rotating end ramp 120 relative to deck section 152.

Figure 9:
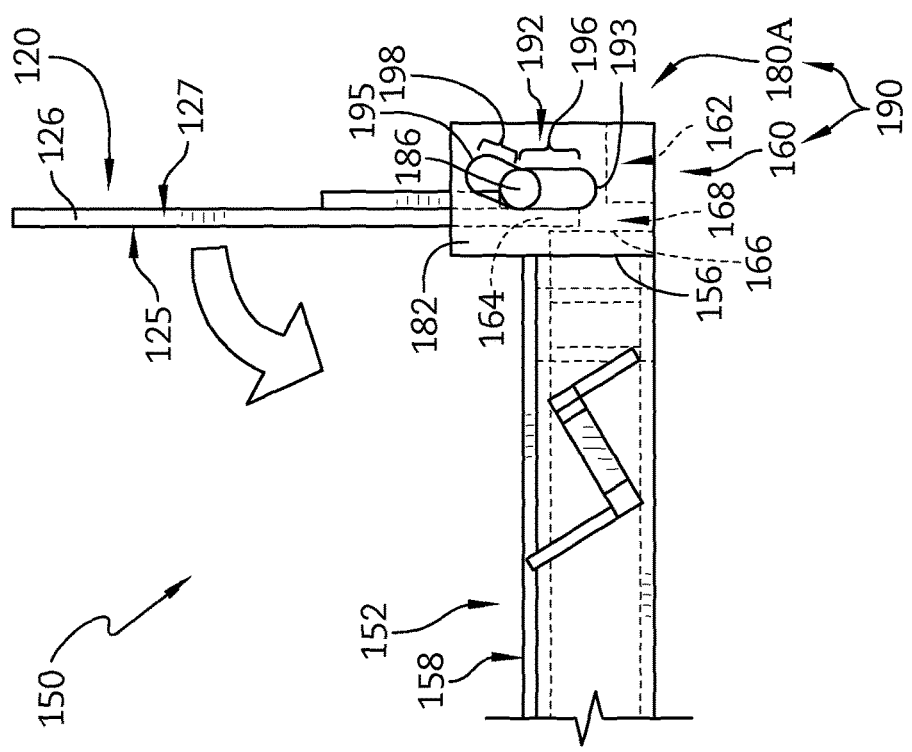
FIG. 9 is a view similar to FIG. 5 showing the end ramp in the intermediate position and suggesting that the end ramp may rotate relative to the deck section from the intermediate position to the closed position and that the ramp lock restricts rotation of the end ramp such that end ramp does not move from the intermediate position to the ramp position.

A user may move items onto the load platform 150 and move end ramp 120 into the retention position shown in FIG. 6 to prevent the items from falling off of distal edge 156 of deck section 152. A user may move end ramp 120 from the retention position to the closed position by lifting end ramp 120 to an intermediate position, as shown in FIG. 9. Lock tab 164 is clear of lock bar 162 while end ramp 120 is in the intermediate position, and the user may rotate end ramp 120 to the closed position as shown in FIG. 10. In one embodiment, lock tab 164 is clear of lock bar 162 in the intermediate position, but is not clear of lock wall 166 while in the intermediate position. As such, end ramp 120 is rotated to the closed position, shown in FIG. 10, but may not be rotated to the operational position, shown in FIG. 8, due to lock tab 164 contacting lock wall 166.

Another illustrative load platform 250 adapted for use in lift gate 10 is shown in FIGS. 11-17. Load platform 250 is generally similar to load platform 150 shown in FIGS. 1-10 described herein. Accordingly, similar reference numbers in the 200 series indicate features that are common between load platform 150 and load platform 250. The description of load platform 150 is hereby incorporated by reference to apply to load platform 250, except in instances when it conflicts with the specific description and drawings of load platform 250.

Similarly to load platform 150, load platform 250 includes an end ramp 220 pivotally connected to a deck section 252 by a ramp positioner 290. Ramp positioner 290 includes a first ramp guide 280A and a second ramp guide 280B coupled to opposing ends of a distal edge 256 of deck section 252, as shown in FIG. 11. Each ramp guide 280A, 280B includes a guide plate 282 coupled to distal edge 256 of deck section 252, a guide slot 292 formed in guide plate 282, and a guide pin 286 coupled to end ramp 220 and positioned to move within guide slot 292.

In the illustrative embodiment, guide slot 292 is arcuate or curved and extends between a first end 293 and a second end 295. However, it should be noted that other guide slot profiles are contemplated. Guide pin 286 is sized and arranged to allow guide pin 286 to move within guide slot 292 between first end 293 and second end 295. In the illustrative embodiment, guide pin 286 is generally cylindrical allowing for rotation of guide pin 286 when positioned within guide slot 292. In some embodiments, guide pin 286 includes a pair of separate pins coupled to end ramp 220 at opposing sides thereof. In some embodiments, guide pin 286 is a single continuous rod extending along end ramp 220 to form the pins at opposing sides of end ramp 220.

Ramp positioner 290 further includes a ramp lock 260 as shown in FIGS. 11-15. Ramp lock 260 includes a lock wall 266 coupled to distal edge 256 of deck section 252 and a lock tab 264 formed by inner edge 222 of end ramp 220. In one illustrative embodiment, lock tab 264 is generally parallel to end ramp 220 and extends therefrom. Guide pin 286 is connected to a bottom surface 227 of end ramp 220 and positioned near lock tab 264 of end ramp 220. In some embodiments, lock wall 266 includes one or more wall sections positioned along distal edge 256 of deck section 252. In some embodiments, lock wall 266 is a single continuous wall extending between guide plates 282 of each ramp guide 280A, 280B.

In operation, ramp positioner 290 allows a user to move end ramp 220 between several discrete use positions. For example, as shown in FIG. 11, a user may grip end ramp 220 along outer edge 224 thereof to lift and rotate end ramp 220 about guide pin 286. A user may then lower end ramp 220 into a generally upright retention position, as shown in FIG. 12.

Once in the retention position shown in FIG. 12, ramp lock 260 and ramp guides 280A, 280B cooperate to restrict rotation of end ramp 220. For example, a lateral force applied to top surface 225 of end ramp 220 is counteracted by lock tab 264 contacting lock wall 266 and guide pin 286 contacting guide slot 292. As such, a user may remove items from vehicle 12 and place them on load platform 250, and end ramp 220 blocks the items from falling off distal edge 256 of deck section 252. Conversely, a lateral force applied to bottom surface 227 of end ramp 220 may cause end ramp 220 to fall onto deck section 252 as suggested in FIG. 15. Additionally, end ramp 220 may fall onto deck section 252 by its own weight if placed in a generally vertical position. As such, end ramp 220 is positioned at an angle α with respect to vertical so that end ramp 220 does not fall onto deck section 252 on its own. Angle α is in a range from about, or precisely, 1 degree to about, or precisely, 15 degrees such that end ramp 220 is still in a generally upright position to retain items located on deck section 252.

In the illustrative embodiment, a user may move end ramp 220 between the retention position and an operational position shown in FIG. 14. Beginning at FIG. 12, a user may grip end ramp 220 along outer edge 224 thereof to lift end ramp 220 into a swing position as shown in FIG. 13. In the swing position, lock tab 264 is clear of lock wall 266, allowing lock tab 264 to pass over lock wall 266 and allowing a user to rotate end ramp 220. Second end 295 of guide slot 292 is positioned such that when guide pin 286 contacts second end 295 of guide slot 292, lock tab 264 does not contact lock wall 266. In the illustrative embodiment, the arcuate profile of guide slot 292 allows guide pin 286 to be moved away from lock wall 266 to free lock tab 264 from contact with lock wall 266. The arcuate profile of guide slot 292 allows a user to rotate end ramp 220 while maintaining a low profile of guide plates 282. However, it should be noted that other slot arrangements are contemplated.

A user may rotate end ramp 220 while in the swing position shown in FIG. 13 to the operational position shown in FIG. 14. Outer edge 224 of end ramp 220 is in contact with a loading surface to allow items located on load platform 250 to be moved to the loading surface. Alternatively, outer edge 224 of end ramp 220 is located above or lateral to the loading surface. In such a case, ramp guides 280A, 280B and ramp lock 260 cooperate to maintain end ramp 220 in the operational position. For example, a stop block 267 is coupled to bottom surface 227 of end ramp 220 and positioned to contact lock wall 266, or other structure, while guide pin 286 contacts guide slot 292 to limit rotation of end ramp 220. In some embodiments, stop block 267 extends the entire length of end ramp 220. In some embodiments, stop block 267 includes one or more sections positioned between opposing sides of end ramp 220. A user may move end ramp 220 back to either the closed position or retention position by lifting end ramp 220 into the swing position and rotating end ramp 220 relative to deck section 252.

A user may move items onto load platform 250 and move end ramp 220 into the retention position shown in FIG. 12 to prevent the items from falling off of distal edge 256 of deck section 252. Unlike load platform 150, load platform 250 does not include a lock bar to limit rotation of end ramp 220. As such, a user may move end ramp 220 from the retention position to the closed position by rotating end ramp 220 to the closed position without requiring lifting of end ramp 220 as suggested by FIG. 15.

In the illustrative embodiment, load platform 250 further includes a ramp retainer 259 as shown in FIGS. 16 and 17. Ramp retainer 259 is coupled to floor 258 of deck section 252 and arranged to rotate in a plane generally parallel to floor 258. When end ramp 220 is moved to the closed position, ramp retainer 259 is rotated to overlay and engage a portion of bottom surface 227 of end ramp 220, as suggested in FIGS. 16 and 17. Ramp retainer 259 limits rotation of end ramp 220 with respect to deck section 252. Ramp retainer 259 is an elongated plate like member, but other configurations are also contemplated.

Another illustrative load platform 350 adapted for use in lift gate 10 is shown in FIGS. 18-20. Load platform 350 is generally similar to load platform 250 shown in FIGS. 11-17 described herein. Accordingly, similar reference numbers in the 300 series indicate features that are common between load platform 250 and load platform 350. The description of load platform 250 is hereby incorporated by reference to apply to load platform 350, except in instances when it conflicts with the specific description and drawings of load platform 350.

Similarly to load platform 250, load platform 350 includes an end ramp 320 pivotally connected to a deck section 352 by a ramp positioner 390. Ramp positioner 390 includes a first ramp guide 380A and a second ramp guide 380B (only first ramp guide 380A is shown) coupled to opposing ends of a distal edge 356 of deck section 352, as suggested in FIG. 18. Each ramp guide 380A, 380B includes a guide plate 382 coupled to distal edge 356 of deck section 352, a guide slot 392 formed in guide plate 382, and a guide pin 386 coupled to end ramp 320 and positioned to move within guide slot 392.

In the illustrative embodiment, guide slot 392 is arcuate or curved and extends between a first end 393 and a second end 395. However, it should be noted that other guide slot profiles are contemplated. Guide pin 386 is sized and arranged to allow guide pin 386 to move within guide slot 392 between first end 393 and second end 395. In the illustrative embodiment, guide pin 386 is generally cylindrical allowing for rotation of guide pin 386 when positioned within guide slot 392. In some embodiments, guide pin 386 includes a pair of separate pins coupled to end ramp 320 at opposing sides thereof. In some embodiments, guide pin 386 is a single continuous rod extending along end ramp 320 to form the pins at opposing sides of end ramp 320.

Ramp positioner 390 further includes a ramp lock 360 as shown in FIGS. 18-20. Ramp lock 360 includes a lock wall 366 coupled to distal edge 356 of deck section 352 and a lock tab 364 formed by inner edge 322 of end ramp 320. In some embodiments, lock wall 366 includes one or more wall sections positioned along distal edge 356 of deck section 352. In some embodiments, lock wall is a single continuous wall extending between guide plates 382 of each ramp guide 380A, 380B. In one illustrative embodiment, lock tab 364 is generally parallel to end ramp 320 and extends therefrom. Guide pin 386 is connected to a bottom surface 327 of end ramp 320 and positioned near lock tab 364 of end ramp 320. In the illustrative embodiment, a spacer plate 321 is coupled to bottom surface 327 of end ramp 320.

In operation, ramp positioner 390 allows a user to move end ramp 320 between several discrete use positions. For example, as shown in FIG. 18, a user may grip end ramp 320 to lift and rotate end ramp 320 about guide pin 386. A user may then lower end ramp 320 into a generally upright retention position, as shown in FIG. 19.

Once in the retention position shown in FIG. 19, ramp lock 360 and ramp guides 380A, 380B cooperate to restrict rotation of end ramp 320. For example, a lateral force applied to top surface 325 of end ramp 320 is counteracted by lock tab 364 contacting lock wall 366 and guide pin 386 contacting guide slot 392. As such, a user may remove items from vehicle 12 and place them on load platform 350, and end ramp 320 blocks the items from falling off distal edge 356 of deck section 352. Conversely, a lateral force applied to bottom surface 327 of end ramp 320 may cause end ramp 320 to fall onto deck section 352. Additionally, end ramp 320 may fall onto deck section 352 by its own weight if placed in a generally vertical position. As such, end ramp 320 is positioned at an angle θ with respect to vertical so that end ramp 320 does not fall onto deck section 352 on its own. Angle θ is in a range from about, or precisely, 1 degree to about, or precisely, 30 degrees such that end ramp 320 is still in a generally upright position to retain items located on deck section 352.

In the illustrative embodiment, a user may move end ramp 320 between the retention position and an operational position shown in FIG. 20. Beginning at FIG. 19, a user may grip end ramp 320 to lift end ramp 320 into a swing position where lock tab 364 is clear of lock wall 366, allowing lock tab 364 to pass over lock wall 366 and allowing a user to rotate end ramp 320. Second end 395 of guide slot 392 is positioned such that when guide pin 386 contacts second end 395 of guide slot 392, lock tab 364 does not contact lock wall 366. In the illustrative embodiment, the arcuate profile of guide slot 392 allows guide pin 386 to be moved away from lock wall 366 to free lock tab 364 from contact with lock wall 366. The arcuate profile of guide slot 392 allows a user to rotate end ramp 320 while maintaining a low profile of guide plates 382. However, it should be noted that other slot arrangements are contemplated.

A user may rotate end ramp 320 while in the swing position to the operational position shown in FIG. 20. An outer edge of end ramp 320 is in contact with a loading surface to allow items located on load platform 350 to be moved to the loading surface. Alternatively, the outer edge of end ramp 320 is located above or lateral to the loading surface. In such a case, ramp guides 380A, 380B and ramp lock 360 cooperate to maintain end ramp 320 in the operational position. For example, a stop block 367 is coupled to bottom surface 327 of end ramp 320 and positioned to contact lock wall 366, or other structure, while guide pin 386 contacts guide slot 392 to limit rotation of end ramp 320. In the illustrative embodiment, an engagement wall 361 of stop block 367 is angled with respect to bottom surface 327 and engages with lock wall 366. In some embodiments, stop block 367 extends the entire length of end ramp 320. In some embodiments, stop block 367 includes one or more sections positioned between opposing sides of end ramp 320. A user may move end ramp 320 back to either the closed position or retention position by lifting end ramp 320 into the swing position and rotating end ramp 320 relative to deck section 352.

A user may move items onto load platform 350 and move end ramp 320 into the retention position shown in FIG. 19 to prevent the items from falling off of distal edge 356 of deck section 352. Unlike load platform 150, load platform 350 does not include a lock bar to limit rotation of end ramp 320. As such, a user may move end ramp 320 from the retention position to the closed position by rotating end ramp 320 to the closed position without requiring lifting of end ramp 320. Similar to load platform 250, load platform 350 may further include a ramp retainer coupled to floor 358 of deck section 352 and arranged to limit rotation of end ramp 320 with respect to deck section 352.

Various features of the invention have been particularly shown and described in connection with the illustrated embodiment of the invention, however, it must be understood that these particular arrangements merely illustrate, and that the invention is to be given its fullest interpretation within the terms of the appended claims.

The invention claimed is:

1. A lift gate arranged to be attached to a vehicle for use in loading and unloading cargo from the vehicle, the lift gate comprising:
    a lift mechanism arranged to be coupled to the vehicle, and
    a load platform coupled to the lift mechanism and moveable between a lowered position and a raised position at the selection of a user, the load platform comprising:
        a deck section including a proximal end coupled to the lift mechanism and a distal end spaced apart from the proximal end,
        an end ramp coupled to the distal end of the deck section and configured to rotate relative to the deck section between a closed position where the end ramp is positioned to lie along the deck section, a retention position where the end ramp is in a generally upright position, and an operational position where the end ramp extends away from the distal end of the deck section, and
        a ramp positioner coupled between the end ramp and the deck section and configured to allow the end ramp to move between the closed position, the retention position, and the operational position at the selection of a user,
    wherein the end ramp includes a proximal end and a distal end spaced apart from the proximal end, the ramp positioner includes a pair of plates coupled to the distal end of the deck section on opposing sides of the end ramp and at least one pin coupled to the end ramp between the proximal end and distal end, the pair of plates are each formed to include a slot positioned to receive the at least one pin, the at least one pin slides within the slots of the plates when moving the end ramp between the closed position, the retention position, and the operational position, and the portion of the end ramp between the pin and the proximal end defines a tab to engage the deck section and limit rotation of the end ramp relative to the deck section at the selection of a user when the end ramp is in the retention position.

2. The lift gate of claim 1, wherein the at least one pin engages with the plates and the tab engages with the deck section to prevent unwanted rotation of the end ramp.

3. The lift gate of claim 2, wherein the ramp positioner further includes at least one lock bar spaced apart from the distal end of the deck section to define a gap between the deck section and the lock bar sized to receive the tab of the end ramp.

4. The lift gate of claim 3, wherein the tab of the end ramp is received in the gap when the end ramp is in the retention position and wherein the at least one pin engages with the plates and the tab engages with the lock bar to prevent unwanted rotation of the end ramp.

5. The lift gate of claim 4, wherein the end ramp is generally vertical when in the retention position.

6. The lift gate of claim 2, wherein the end ramp is positioned at an angle relative to a vertical direction away from the deck section when the end ramp is in the retention position.

7. The lift gate of claim 6, wherein the angle is from about 1 degree to about 30 degrees.

8. The lift gate of claim 1, wherein each slot includes a first end and a second end spaced apart from the first end and wherein the second end of the slot is positioned farther from the distal end of the deck section than the first end of the slot.

9. The lift gate of claim 8, wherein the end ramp is free to rotate relative to the deck section when the at least one pin is located at the second end of the slot.

10. The lift gate of claim 9, wherein each slot includes a first section extending from the first end of the slot and a second section extending from the second end of the slot and wherein the second section is angled relative to the first section.

11. The lift gate of claim 9, wherein each slot is generally arcuate.

12. The lift gate of claim 9, wherein each slot includes at least a portion which is generally arcuate.

13. The lift gate of claim 2, wherein the at least one pin engages with the plates and the end ramp engages with the lock bar to prevent unwanted rotation of the end ramp to maintain the end ramp in the operational position.

14. The lift gate of claim 1, further comprising a stop block coupled to a bottom surface of the end ramp and wherein the at least one pin engages with the plates and the stop block engages with the deck section to resist rotation of the end ramp due to forces placed on a top surface of the end ramp to maintain the end ramp in the operational position.

15. The lift gate of claim 14, wherein an engagement wall of the stop block is angled with respect to a bottom surface of the end ramp and engages with the deck section.

16. The lift gate of claim 1, further comprising a ramp retainer coupled to the deck section and configured to provide means for restricting rotation of the end ramp relative to the deck section when the end ramp is in the closed position at the selection of a user.

17. The lift gate of claim 16, wherein the ramp retainer comprises an elongated plate spaced apart from a top surface of the deck section and mounted for rotation relative to the deck section between a locked position where the plate overlays the end ramp to block rotation of the end ramp and an unlocked position where the plate is rotated away from the end ramp to allow the end ramp to rotate at the selection of a user.

* * * * *